(12) United States Patent
Wilhelmsson et al.

(10) Patent No.: US 7,907,673 B2
(45) Date of Patent: Mar. 15, 2011

(54) ROBUST AND LOW-COMPLEXITY COMBINED SIGNAL POWER ESTIMATION

(75) Inventors: Leif Wilhelmsson, Dalby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 659 days.

(21) Appl. No.: 11/762,382

(22) Filed: Jun. 13, 2007

(65) Prior Publication Data

US 2008/0101488 A1    May 1, 2008

Related U.S. Application Data

(60) Provisional application No. 60/863,046, filed on Oct. 26, 2006.

(51) Int. Cl.
*H04K 1/10* (2006.01)

(52) U.S. Cl. .......................................................... 375/260

(58) Field of Classification Search .................... 375/260
See application file for complete search history.

(56) References Cited

U.S. PATENT DOCUMENTS

| | | | | |
|---|---|---|---|---|
| 5,608,764 A * | 3/1997 | Sugita et al. | ................ | 375/344 |
| 5,682,376 A * | 10/1997 | Hayashino et al. | ........... | 370/206 |
| 6,310,856 B1 | 10/2001 | Taipale | | |
| 6,853,631 B1 * | 2/2005 | Nakamura et al. | ............ | 370/342 |
| 6,980,612 B1 | 12/2005 | Miyoshi | | |
| 7,149,258 B2 | 12/2006 | Nilsson et al. | | |
| 7,180,965 B2 * | 2/2007 | Eilts et al. | ..................... | 375/340 |
| 2002/0101840 A1 * | 8/2002 | Davidsson et al. | ........... | 370/330 |
| 2002/0110138 A1 * | 8/2002 | Schramm | ....................... | 370/430 |
| 2003/0026371 A1 * | 2/2003 | Laroia et al. | ................... | 375/362 |
| 2003/0169682 A1 * | 9/2003 | Chen et al. | ..................... | 370/206 |
| 2004/0004997 A1 | 1/2004 | Boesel et al. | | |
| 2004/0156454 A1 | 8/2004 | Kim | | |
| 2006/0026371 A1 | 2/2006 | Chrysos et al. | | |
| 2006/0045198 A1 * | 3/2006 | Magee et al. | .................. | 375/267 |
| 2006/0073802 A1 | 4/2006 | Chari et al. | | |
| 2006/0146952 A1 * | 7/2006 | Magee | ........................... | 375/267 |
| 2006/0159194 A1 * | 7/2006 | Magee | ........................... | 375/267 |
| 2006/0233097 A1 | 10/2006 | Vrcelj et al. | | |
| 2006/0285599 A1 * | 12/2006 | Seki et al. | ...................... | 375/260 |
| 2007/0053282 A1 * | 3/2007 | Tong et al. | ..................... | 370/208 |

FOREIGN PATENT DOCUMENTS

EP    1 176 750 A    1/2002

OTHER PUBLICATIONS

Anton-Haro, "Probabilistic algorithms for blind adaptive multiuser detection," Signal Processing, IEEE Transactions on Vol. 46, Issue: 11 Publication Nov. 1998 , pp. 2953-2966.*

(Continued)

*Primary Examiner* — Juan A Torres
(74) *Attorney, Agent, or Firm* — Potomac Patent Group PLLC

(57) ABSTRACT

Ascertaining a signal power of an Orthogonal Frequency Division Multiplexing (OFDM) signal involves ascertaining a plurality of channel estimates from the OFDM signal. Compensating phase shift values for phase aligning the plurality of channel estimates are estimated and used to generate phase corrected channel estimates. The phase corrected channel estimates are coherently combined, thereby ascertaining the signal power of the OFDM signal. The compensating phase shift values may be based on a channel characteristic (e.g., delay spread) or may alternatively be hypothesized.

22 Claims, 6 Drawing Sheets

OTHER PUBLICATIONS

PCT International Search Report, mailed Mar. 31, 2008, in connection with International Application No. PCT/EP2007/060468.

PCT Written Opinion, mailed Mar. 31, 2008, in connection with International Application No. PCT/EP2007/060468.

R1-062990 "Outcome of cell search drafting session", TSG-RAN WG1 #46bis, Oct. 9-13, 2006, Seoul, Korea.

Corrected PCT International Serach Report and Written Opinion, mailed Apr. 11, 2008, in connection with International Application No. PCT/EP2007/060468.

* cited by examiner

ROBUST AND LOW-COMPLEXITY COMBINED SIGNAL POWER ESTIMATION

CROSS REFERENCE TO RELATED APPLICATIONS

This application claims the benefit of U.S. Provisional Application No. 60/863,046, filed Oct. 26, 2006, which is hereby incorporated herein by reference in its entirety.

BACKGROUND

The present invention relates to methods and apparatuses for estimating channel quality information (CQI) in a communication system in which CQI pilots are transmitted on a plurality of sub-carriers.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

There are several reasons why OFDM has been chosen for the LTE system. One is that receiver complexity can be made relatively low. Another reason is that it, at least in theory, allows for very efficient usage of the available bandwidth. In case only one user is transmitting, it is possible to exploit that the channel quality typically is very different at different frequencies (in this respect, the channel is said to be "frequency selective"). Since the information in OFDM is transmitted on a large number of sub-carriers, different modulation and coding techniques can be applied on different sub-carriers, rather than using the same modulation and coding techniques on all sub-carriers. However, in order for this to be possible, the quality of the different sub-carriers of the channel (for instance the signal-to-noise-ratio) must be estimated and these estimates must be fed back to the transmitter.

In case several users are sharing the available bandwidth, the term orthogonal frequency division multiple access (OFDMA) is often used. In OFDMA, the sharing of the channel is achieved by allocating different sub-carriers to different users. The allocation of the sub-carriers to the different users can vary from one symbol to the next, so the channel is effectively divided in both time and frequency. For a cellular system with one base station and several mobile stations, the channels from the base stations to the different mobile stations vary differently and typically independently of one another. With respect to OFDMA, the idea of transmitting more information on the sub-carriers that have good quality, as described above, can be generalized in the following way. The quality on all sub-carriers for all users is determined. The base station then decides not only what the optimum modulation and coding techniques are, but also which sub-carriers should be allocated to which users.

Although the potential gain to be achieved by using adaptive modulation and coding is considerable, it is not so easily obtained in practice. First, in order to estimate the channel quality, known symbols must be transmitted. Henceforth, these symbols are referred to as channel quality information (CQI) pilots. The cost of transmitting CQI pilots is two-fold. First, part of the transmitted power is used for transmitting pilots rather than actual data. Second, the effective data rate that can be supported is reduced, since some of the symbols are not carrying any user data.

The reason why the potential gain is not obtained is that the channel's effect on the transmitted signal cannot be made perfectly known to the transmitting side. One reason for this is that the channel is time-varying. This means that even if the channel were to be estimated perfectly at the receiver side, the channel will have changed by the time that information became available at the transmitter side.

Another reason why the potential gain is not obtained is that the channel quality is not estimated accurately enough. Since the CQI pilots intended for estimating the channel come at the cost of reduced data throughput, the number of CQI pilots is often very small, which implies that the accuracy of the channel estimate by necessity will be limited. An additional problem is that when CQI pilots are transmitted on different sub-carriers, they are affected differently by, for example, the channel. That the CQI pilots are affected differently is of course not unexpected given that the channel is frequency selective. However, the problem is that in many practical situations the respective phases of two adjacent CQI pilots will change much more than their respective amplitudes.

This means that one cannot estimate the average power by coherently combining the CQI pilots. Instead, one must rely on non-coherent combining. Non-coherent combining is known to have a certain loss compared to coherent combining. Consequently, the estimated channel quality will be less accurate than if coherent combining had been possible, and as a result the system performance will be degraded.

The reason for the quality degradation using non-coherent combining is that non-coherent combining gives rise to a biased estimate as well as an increased variance. In mathematical terms, assuming a channel estimate for a specific sub-carrier is $\hat{h}=h+e$, where e is assumed to be complex valued Gaussian noise (variance $\sigma^2$), and estimating the power $(S=|h|^2)$ by coherent averaging over M channel estimates and then using non-coherent averaging over N samples we obtain $$\hat{S} = \frac{1}{N}\sum_{l=1}^{N}\left|\frac{1}{M}\sum_{k=1}^{M}\hat{h}_k\right|_l^2. \tag{1}$$

One can now show that $$\frac{N}{\sigma^2}\hat{S}$$

is a sum of non-central $\chi_{2N}^2(\lambda)$ distributed random variables, where the non-central parameter $\lambda$ is $$\lambda = 2N\frac{|h|^2}{\sigma^2/M}. \tag{2}$$

Applying the central limit theorem, one obtains $$\hat{S} \in N\left(|h|^2 + \frac{\sigma^2}{M}, \frac{\sigma^2}{MN}\left(\frac{\sigma^2}{M} + 2|h|^2\right)\right). \tag{3}$$

The derivations of equations (1) through (3) are valid in Additive White Gaussian Noise (AWGN) channels, that is, in which the channel is constant over time and over sub-carriers. In practice, with delay spread (and/or Doppler), the channel is not constant over frequency (and/or time), and hence equation (3) is in that case only an approximation.

From the above it can be seen that the power estimate, $\hat{S}$, is biased, with a term equal to $\sigma^2/M$;

the coherent averaging of M channel estimates primarily reduces the bias, which could be a problem for low Signal-to-Interference Ratios (SIRs) if M is small; and the product NM reduces the variance of the estimate.

It can be noted that NM is the total number of pilots available for estimation, and clearly the estimate will have the smallest bias as well as variance if M=NM (i.e., if N=1 meaning that all pilots are coherently combined).

Estimating the channel quality by using the CQI pilots using non-coherent combining is known. This is a straightforward approach, but its drawback is that its performance is, in many cases, relatively poor. The reason why non-coherent combining is nonetheless used is simply that no phase knowledge is available in conventional systems, making coherent combining seem infeasible.

A fundamental problem with using pilot symbols that are transmitted on different sub-carriers for CQI estimation is that the phases for the different sub-carriers typically are affected in different and unknown ways from one another. This means that coherent alignment of the pilots before averaging is not feasible.

In order to simplify the description of the invention and to describe why it is not possible, using conventional techniques, to perform coherent combining, but without limiting the scope of the invention in any way, let it be assumed that the parameters for the OFDM system are those currently standardized in 3GPP. Specifically, it will be assumed for the sake of example that the spacing between the sub-carriers is 15 kHz and that the duration of the useful part of the symbol equals the reciprocal of this, that is, $t_{symb}$=0.067 ms. For simplicity, suppose that the length of the cyclic prefix (CP) is $t_{CP}$=4.69 μs. (It is well-known that, in modulation techniques such as OFDM, a transmitted signal comprises a symbol portion and a cyclic prefix that precedes the symbol portion, wherein the cyclic prefix is a replica of a tail portion of the symbol portion.) Moreover, in the 3GPP standard, the total bandwidth is divided into so-called resource blocks, each containing 12 sub-carriers. A resource block constitutes the smallest possible amount of sub-carriers that can be allocated to a user.

Reasons why different sub-carriers are affected differently might be that the channel as such is frequency selective, but it might also be caused by a synchronization error.

First, consider the case in which the channel is frequency selective, and suppose that the channel consists of two taps of equal strength, wherein the delay between the two taps equals Δt seconds. The impulse response of the channel can then, possibly after scaling, be written as $$h(t)=\delta(t)+\delta(t-\Delta t),\quad(4)$$

and the corresponding channel transfer function is then given by $$H(f)=1+e^{-j2\pi f\Delta t}=2e^{-j\pi f\Delta t}\cos(\pi f\Delta t)\quad(5)$$

Now suppose that Δt=2 μs and consider two adjacent sub-carriers. According to equation (5), the phase difference for the channel transfer function for these sub-carriers will be $\pi f \cdot \Delta t$=0.03π=0.094 rad. In case, for example, the pilots used for CQI estimation are six sub-carriers apart, which is the current assumption in the 3GPP specification, then the phase shift between two pilots will be 0.56 rad, or about 32 degrees. Although this rotation is small enough to allow for coherent combining of two pilots (which corresponds to one resource block), it is clear that using pilots from several resource blocks would result in phase differences that would render coherent combining infeasible.

Now, consider the case in which the channel is frequency flat, but in which ε samples from the CP are used by the Fast Fourier Transform (FFT). (It is well-known that when modulation techniques like OFDM are used, demodulation involves applying a Fourier Transform to the received signal.) FIG. 1, which is a diagram of an exemplary OFDM signal 100 comprising an N-sample wide symbol part 101 and a CP 103, will help illustrate this situation. The CP 103 comprises a copy of information 105 that is also present in a tail portion of the symbol part 101. An initial part, but not all, of the CP 103 also includes inter-symbol interference 107. Suppose an N-sample wide FFT window 109 obtains its first sample at a position 111 that is ε samples earlier than the latest possible position 113 that will still avoid Inter-Symbol Interference (ISI). Note that in this case the start 111 of the FFT window 109 (i.e., the samples used by the FFT) is placed in the middle of the ISI free part of the CP 103. It can be shown that the difference in placing the FFT window as shown in the figure compared to placing it as late as possible (i.e., ε=0) will result in a phase shift at the output of the FFT according to $$X_\epsilon(l)=X(l)e^{-j2\pi\epsilon l/N}\quad(6)$$

where N is the size of the FFT and l is the index of the frequency bin at the output of the FFT and is in the range −N/2+1 to N/2. Now, assuming in our example that the length of the CP is about 7% of N, then a reasonable value of ε/N is, say, 2%. Referring to equation (6), it is readily seen that this produces a phase rotation that changes by 0.12 rad per sub-carrier. Again, if the pilots to be used for CQI estimation are 6 sub-carriers apart, there will be a rotation of 0.72 rad, or equivalently about 41 degrees between the pilots used for CQI estimation. In this example, as in the earlier one, coherent combining over one resource block might be feasible, but coherent combining over several cannot be done using conventional techniques.

Consequently, performance will be degraded whenever several resource blocks are available because one would have to resort to non-coherent combining between the resource blocks. In fact, coherent combining may not even be feasible within a single resource block if a very large delay spread is involved.

In view of the above, there is a need for methods and apparatuses that enable coherent combining of pilots to be performed for CQI estimation, even without any phase reference being available (i.e., without knowing what any actual phase value is for any of the sub-carriers). Such methods and apparatuses would, for example, enhance CQI estimation and by that system performance.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for ascertaining a signal power of an Orthogonal Frequency Division Multiplexing (OFDM) signal. In one aspect, this involves ascertaining a plurality of channel estimates from the OFDM signal. One or more compensating phase shift values for aligning the plurality of channel estimates with respect to phase are estimated. A plurality of phase corrected channel estimates are generated by using the one or more compensating phase shift values to align the plurality of channel estimates with respect to phase. The phase corrected channel estimates are coherently combined, thereby ascertaining the signal power of the OFDM signal.

In one aspect, the channel estimates may be ascertained from different sub-carriers of the OFDM signal.

In another aspect, estimating the one or more compensating phase shift values for aligning the plurality of channel estimates with respect to phase comprises ascertaining a delay spread value of a channel through which the OFDM signal was transmitted, and estimating the one or more compensating phase shift values as a function of the delay spread value. For example, this could involve computing a phase shift between a first sub-carrier at frequency $f_i$ and a second sub-carrier at frequency $f_k$ in accordance with:

$$\text{compensating phase shift} = e^{j2\pi(f_i - f_k)\Delta t},$$

wherein $\Delta t$ is the delay spread value.

In some alternative embodiments, estimating the one or more compensating phase shift values for aligning the plurality of reference symbols with respect to phase comprises ascertaining which of a plurality of samples of the OFDM signal would be a starting point of a Fast Fourier Transform (FFT) causing a smallest rotation across sub-carriers, and estimating the one or more compensating phase shift values as a function of a relative distance between an actual starting point of the FFT and the starting point of the Fast Fourier Transform (FFT) causing the smallest rotation across sub-carriers. In some embodiments the starting point of the FFT causing the smallest rotation across sub-carriers corresponds to a maximum peak of a power delay profile of a channel through which the OFDM signal was transmitted. In some alternative embodiments, the starting point of the FFT causing the smallest rotation across sub-carriers corresponds to a center of gravity of a power delay profile of a channel through which the OFDM signal was transmitted.

In yet other alternative embodiments, estimating the one or more compensating phase shift values for aligning the plurality of reference symbols with respect to phase comprises ascertaining a power delay profile of a channel through which the OFDM signal was transmitted and applying a Fast Fourier Transform (FFT) to the power delay profile to obtain an estimate of the channel through which the OFDM signal was transmitted. The estimate of the channel is then used to obtain the one or more compensating phase shift values as a function of the delay spread value.

In yet other alternative embodiments, estimating the one or more compensating phase shift values for aligning the plurality of reference symbols with respect to phase comprises applying each of a plurality, K, of hypothesized sets of phase corrections to the plurality channel estimates to obtain K sets of hypothesized phase corrected channel estimates. In such embodiments, coherently combining the phase corrected channel estimates can comprise producing K hypotheses of the signal power of the OFDM signal by, for each of the K sets of hypothesized phase corrected channel estimates, coherently combining the hypothesized phase corrected channel estimates. Ascertaining the signal power of the OFDM signal then involves ascertaining which of the K hypotheses of the signal power of the OFDM signal is a maximum one of the K hypotheses of the signal power of the OFDM signal. In some of these embodiments, another aspect includes using information about a delay spread of a channel through which the OFDM signal was transmitted to initially obtain the K hypothesized sets of phase corrections. In some alternative embodiments, information about a power delay profile of a channel through which the OFDM signal was transmitted is used to initially obtain the K hypothesized sets of phase corrections. Also, in some but not necessarily all embodiments, each of the hypothesized sets of phase corrections comprises phase correction values that are linear across sub-carriers.

BRIEF DESCRIPTION OF THE DRAWINGS

The objects and advantages of the invention will be understood by reading the following detailed description in conjunction with the drawings in which.

DETAILED DESCRIPTION

Figure 1:
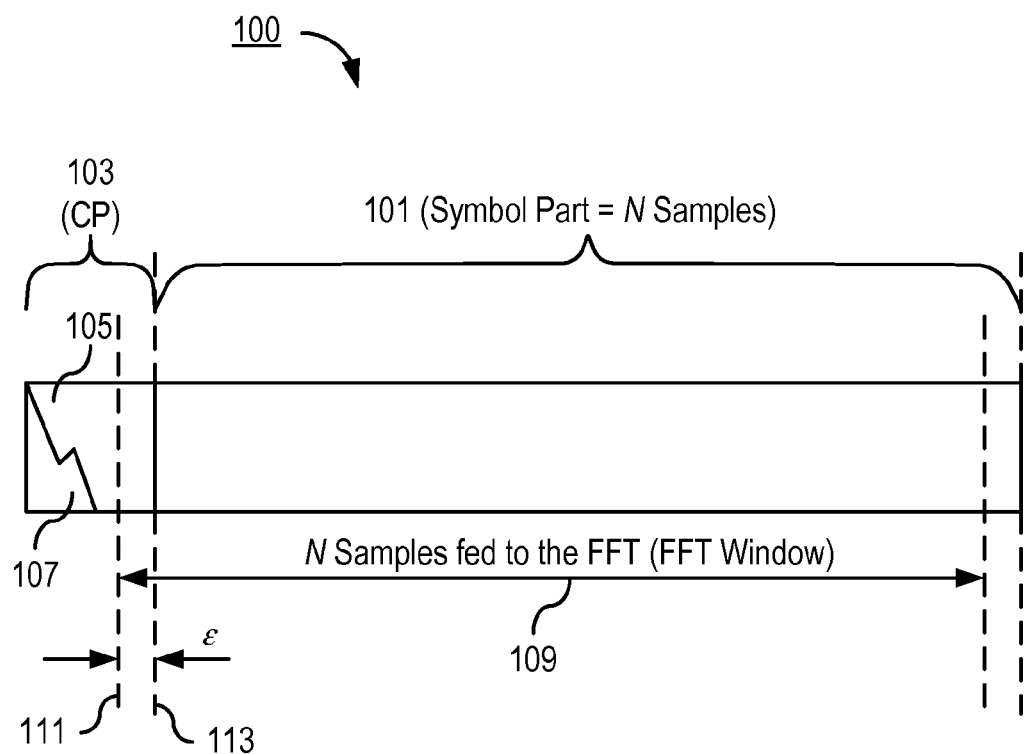
FIG. 1 is a diagram of an exemplary OFDM signal comprising an N-sample wide symbol part and a cyclic prefix.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of the invention involves aligning, with respect to phase, channel estimates derived from different CQI pilots without utilizing an explicit estimate of the phase derived, for example, by means of channel estimation. Alternative embodiments utilize different ways of achieving this. In one, the phase shifts between the different CQI pilots are estimated and their derived channel estimates compensated before those channel estimates are used to generate a combined signal power estimate.

In an alternative embodiment, a blind approach is proposed. In this case, the phase shift between the different CQI pilots is assumed to be proportional to the frequency distance. Different factors for this proportional relation are evaluated, and the one giving the best result (in terms of maximum estimated signal power) is chosen.

These and other aspects are described in greater detail in the following.

Figure 2:
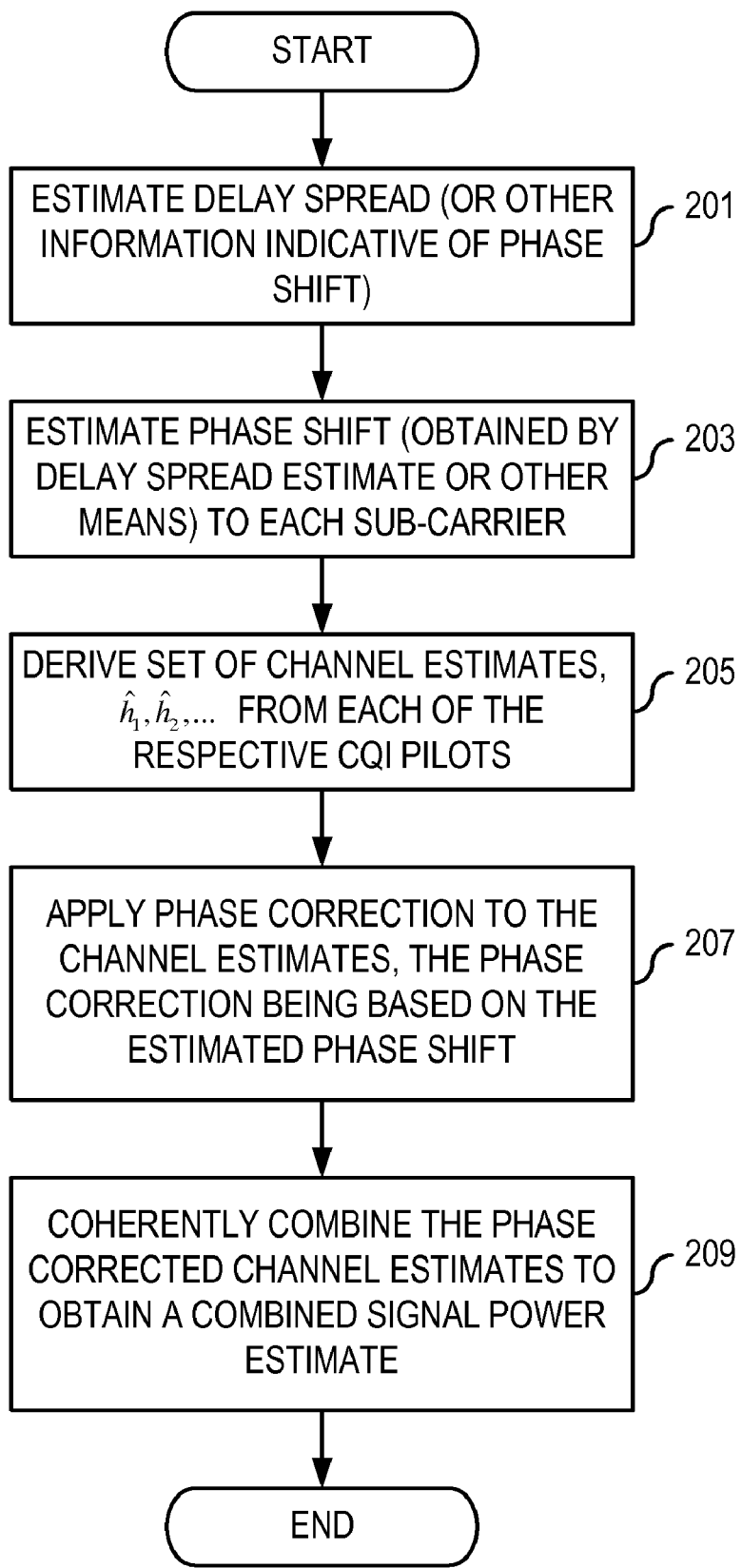
FIG. 2 is a flowchart depicting steps/processes performed by suitable logic operating in cellular communication equipment consistent with embodiments of the invention.

FIG. 2 is a flowchart depicting steps/processes performed by suitable logic (e.g., hardware or software in conjunction with hardware) operating in cellular communication equipment consistent with embodiments of the invention. The delay spread of the channel, as indicated by the received signal, is estimated in a delay spread estimator (step 201). As used herein, the term "delay spread" refers to the time delay between a received signal associated with what is substantially a shortest radio path between transmitter and receiver, and a delayed version of that signal associated with a substantially longest radio path. As used herein, the term "substantially shortest" means the shortest path the signal can traverse and still be received with a non-insignificant amount of energy. Similarly, the term "substantially longest" means the longest path the signal can traverse and still be received with a non-insignificant amount of energy. This allows the possibility that shorter or longer paths exist, but are not considered because the energy of the received signal does not exceed a predefined minimum threshold. Various techniques for estimating delay spread are known, and therefore need not be described here. In an LTE system, the P-SCH can be used to estimate the delay spread. However, other techniques exist and the invention is not limited to any one particular technique.

The delay spread is then applied in a suitable model of the phase variations as a function of the sub-carrier frequency to derive an estimate of the phase shift associated with each sub-carrier (step 203). As an example, the two tap channel model of equation (4) may be used. From equation (5) it can be seen that the phase shift between two sub-carriers (at frequencies $f_i$ and $f_k$) having pilot symbols, given the delay spread $\Delta t$, is a linear function of the distance, in frequency, between the carriers, that is, $e^{j2\pi(f_i-f_k)\Delta t}$.

In addition to estimating the phase shift for each sub-carrier, a channel estimate is derived from each of the CQI pilots, giving the channel estimates $\hat{h}_1, \hat{h}_2, \ldots$ (step 205). In this exemplary embodiment, this step is depicted as occurring after making the delay spread and phase shift estimations. However, it will be appreciated that processing the CQI pilots to derive the set of channel estimates need not be dependent on these earlier steps, so whether channel estimation is performed first, last, or somewhere in between is irrelevant.

Using the estimated phase shift for the sub-carriers, phase correction is applied to the channel estimates (step 207). Mathematically, the channel estimates (assume there are M of them) are phase corrected according to $$\hat{h}_i^{corr} = \hat{h}_i e^{j2\pi\Delta t f_i}, i=1, 2, \ldots M \quad (7)$$

Following phase correction, the phase corrected channel estimates are coherently combined to obtain the combined signal power estimate (step 209). In the exemplary embodiment, this step involves determining combined signal power estimate, $\hat{S}$ according to $$\hat{S} = |\alpha_1 \hat{h}_1^{corr} + \alpha_2 \hat{h}_2^{corr} + \ldots|^2. \quad (8)$$

Here, $\alpha_i$ is a scaling factor. How suitable values for $\alpha_i$ are chosen is outside the scope of the invention. As an example, one could choose $$\alpha_i = \frac{1}{M},$$

where M is the number of channel estimates being coherently combined. This would give a pure average value over the M channel estimates (and hence give an average signal power estimate).

The signal power estimate, $\hat{S}$, can then be used in a variety of ways, such as to obtain a SIR value used for CQI estimation. The particular use to which the signal power estimate is put is beyond the scope of the invention, and is therefore not an essential feature.

The description has so far focused on embodiments utilizing a model of the phase shift between sub-carriers. However, use of such a model is not essential to the invention. Alternative embodiments can advantageously utilize more complete information about the actual channel, when such information is available. For instance, consider FIG. 3a, which is an example of a channel power delay profile 300 of a two-tap channel and illustrates the effects of FFT window placement. A signal 301 is transmitted at time $t_0$. As is known in OFDM technology, a preliminary part of the signal 301 comprises a cyclic prefix (CP) that is a replication of the information carried by a tale-end of the signal 301.

Because of multi-path propagation, a first path between transmitter antenna and receiver antenna results in a first ray 303 being received at time $t_1$, and a second (longer) path results in a second ray 305 being received at time $t_2$. In order to demodulate the signal the receiver will apply an FFT. Placement of the FFT window will yield different effects. A first possible window position 307 begins at a midpoint between those moments at which the two received signals (e.g., first and second rays 303, 305) would result in zero phase shift if considered in isolation from one another. Placement in the middle causes the phase shifts from the individual received signals to be of the same size but of opposite sign. Specifically, the point (herein denoted "$t_{min\_phase}$") can be found as the midpoint between $t_1$ and $t_2$ plus the length of the cyclic prefix. However, such placement would cause the FFT to include severe intersymbol interference (ISI).

To avoid such interference, the FFT window is usually started at an earlier point in time. In order to best eliminate ISI, the FFT window should end at a time that is coincident with the end of the first ray 303. In this example, that endpoint occurs at time $t_{opt\_end}$. A second window position 309 whose endpoint coincides with time $t_{opt\_end}$ accordingly begins at time $t_{opt\_start}$.

In the more general case, a channel will have more than two paths. To illustrate this situation, FIG. 3b is an example of a complete channel power delay profile 350 and the effects of FFT window placement. A signal 351 is transmitted at time $t_0$. Because of multi-path propagation, a first path between transmitter antenna and receiver antenna results in a first ray 353 being received at time $t_{first}$, and a last (longest) path results in a final ray 355 being received at time $t_{last}$. Other rays (not illustrated) are also received by the receiver. As with the case of the two tap channel, in order to demodulate the signal the receiver will apply an FFT. As in the case described above, placement of the FFT window will yield different effects. A first possible window position 357 begins at a point between $t_{first}$ and $t_{last}$ at which the center of gravity of the impulse response occurs plus the length of the cyclic prefix. Alternatively, the point of maximum impulse response of the channel (max(h(t)) could be used. In either case, that point, which is herein denoted $t_{min\_phase}$, will result in a minimum phase rotation between sub-carriers. However, as with the two tap channel example described earlier, such placement would cause the FFT to include severe ISI.

To avoid such interference, the FFT window is usually started at an earlier point in time. In order to best eliminate ISI, the FFT window should end at a time that is coincident with the end of the first ray 353. In this example, that endpoint occurs at time $t_{opt\_end}$. A second window position 359 whose endpoint coincides with time $t_{opt\_end}$ accordingly begins at time $t_{opt\_start}$.

Figure 3A:
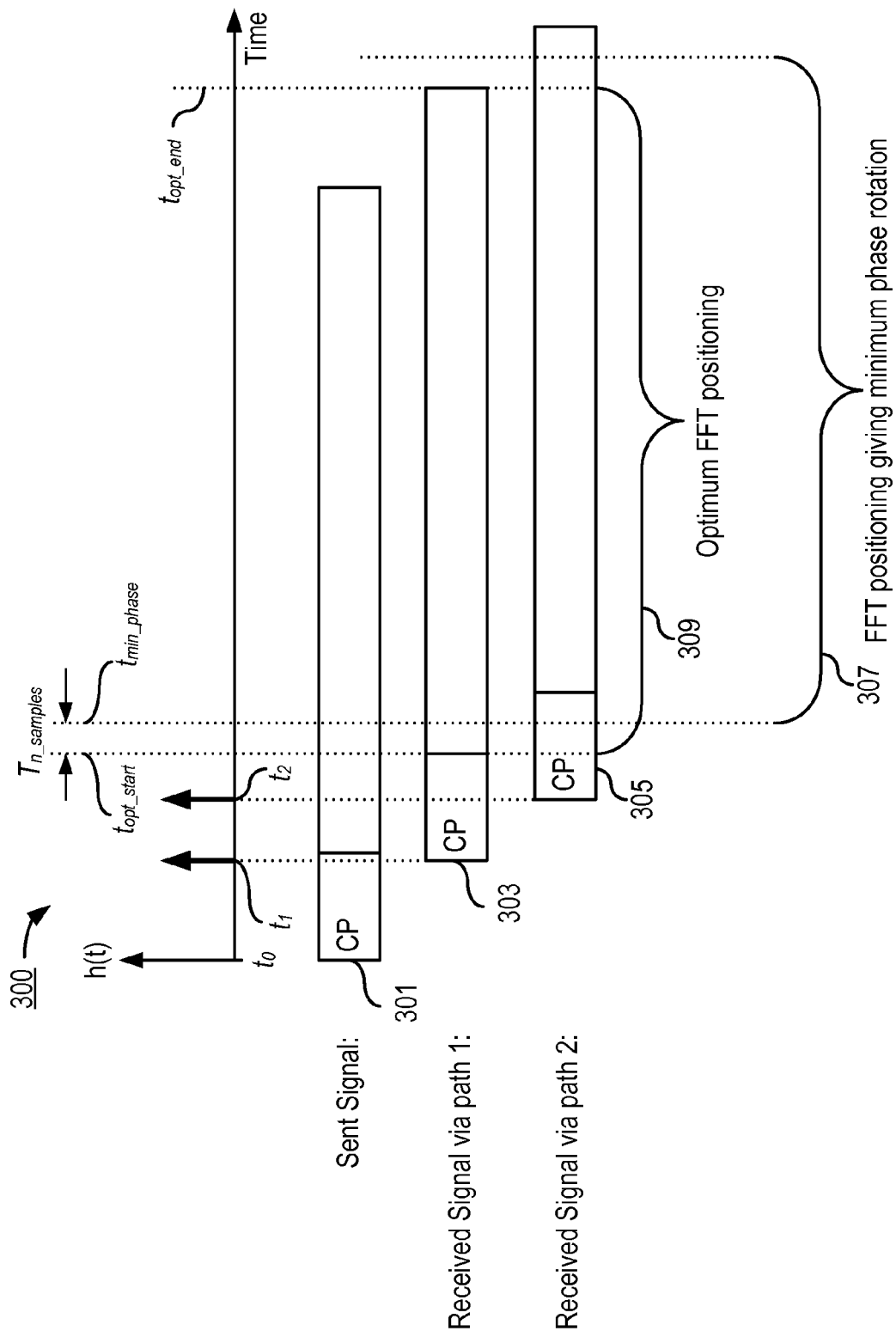
FIG. 3a is an example of a channel power delay profile of a two-tap channel and the effects of FFT window placement.
Figure 3B:
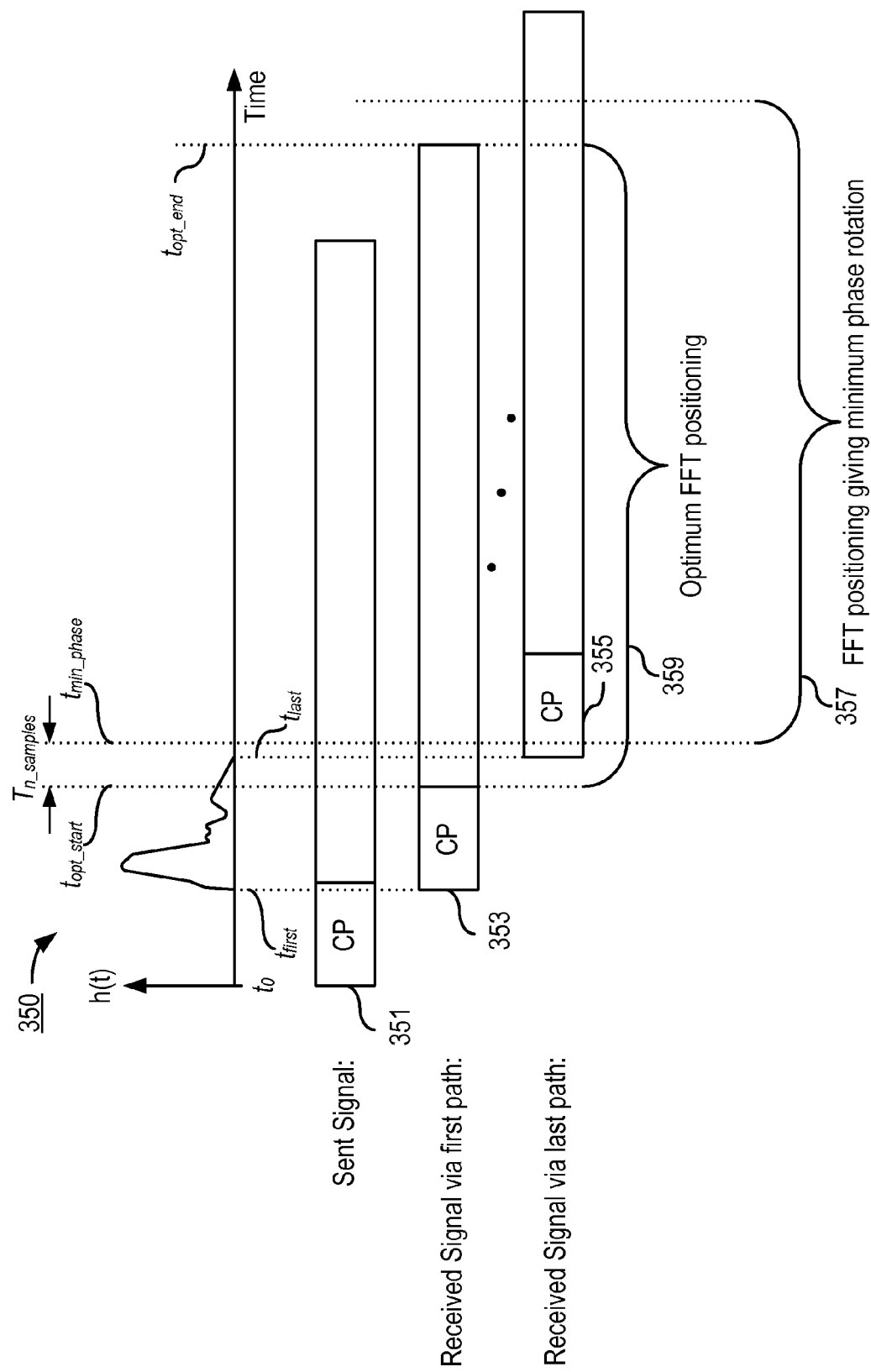
FIG. 3b is an example of a complete channel power delay profile and the effects of FFT window placement.

Regardless of whether one considers the specific two tap channel illustrated in FIG. 3a or the more general case illustrated in FIG. 3b, it can be seen that there is a distance between the point at which the FFT window should be placed to minimize phase rotation (i.e., $t_{min\_phase}$) and the point at which the FFT window is actually placed (i.e., $t_{opt\_start}$) to best avoid ISI. Let this distance be n samples, corresponding to an amount of time herein denoted $T_{n\_samples}$. This placement of the FFT window gives rise to an FFT-introduced rotation between sub-carriers k and 1 of $e^{-j2\pi(k-1)n/N_{FFT}}$, wherein $N_{FFT}$ is the size of the FFT. This expression for phase rotation can therefore be used as a basis for determining the amount of phase compensation (step 203) to be applied to the channel estimates, $\hat{h}_1, \hat{h}_2, \ldots$ (step 207) derived from each sub-carrier after they have been obtained from the received signal (step 205). With this phase compensation having been performed, the remaining step 209 is performed as described earlier.

In other alternative embodiments, still other techniques can be used to derive a phase shift function that can be utilized to determine the amount of phase compensation required for each sub-carrier when performing step 203. For example, one could convert the power delay profile (PDP) 300 into the frequency domain to derive the channel estimate. The channel estimate will include phase information for each sub-carrier, and these can be used as a basis for determining the amount of phase compensation (step 203) to be applied to the channel estimates obtained from the various sub-carriers after they have been obtained from the received signal (step 205). With this phase compensation having been performed, the remaining step 209 is performed as described earlier.

All of the embodiments discussed up to this point use a model of the phase of each sub-carrier to determine how to correct the various channel estimates. The discussion will now focus on methods and apparatuses that do not use this technique.

Figure 4:
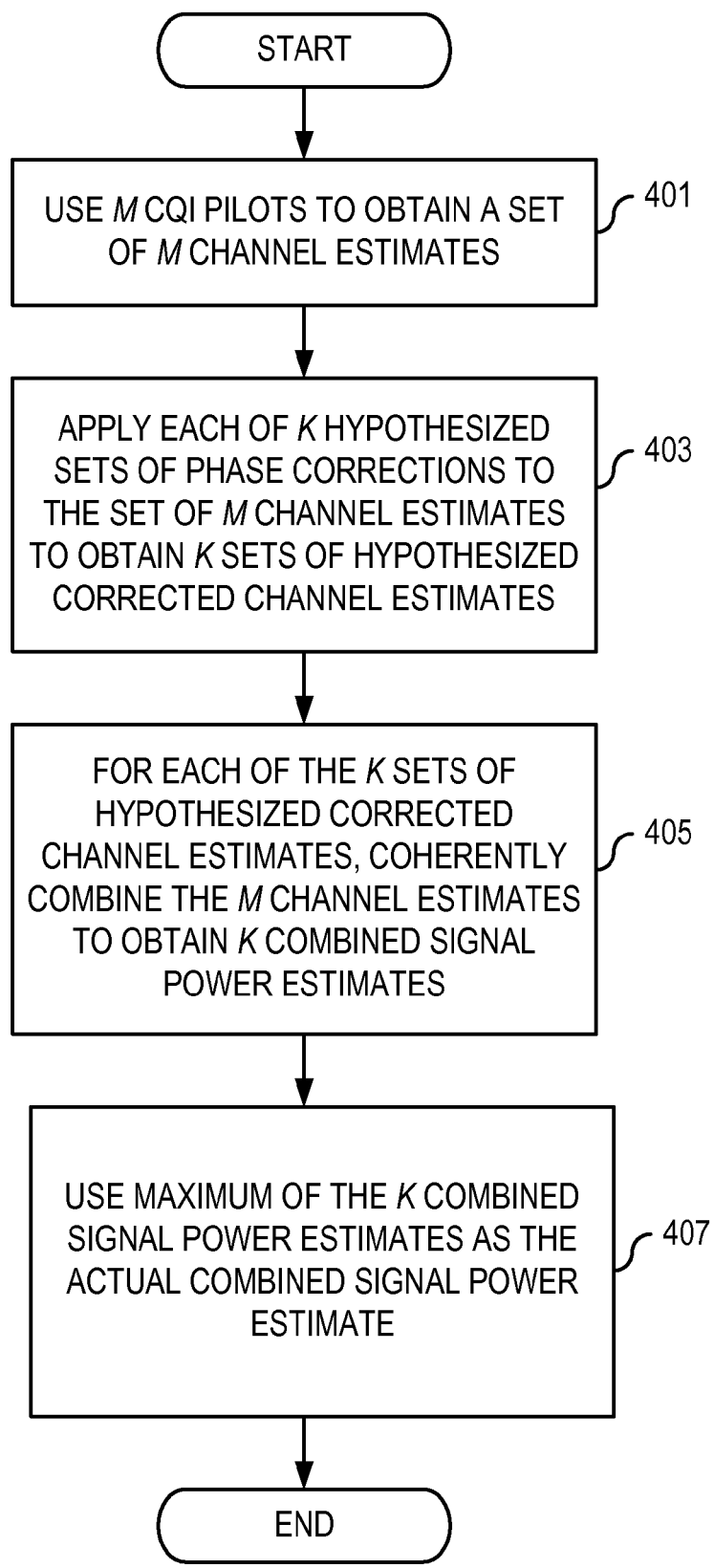
FIG. 4 is a flowchart depicting steps/processes performed in cellular communication equipment consistent with alternative embodiments of the invention that do not rely on a model of the phase of each sub-carrier.

FIG. 4 is a flowchart depicting steps/processes performed by suitable logic (e.g., hardware or software in conjunction with hardware) operating in cellular communication equipment consistent with alternative embodiments of the invention that do not rely on an estimate of the phase of each sub-carrier. A number, M, of CQI pilots are used as a basis for ascertaining M channel estimates, each corresponding to one of the CQI pilots (step 401).

Then each of a number, K, of hypothesized phase shift sequences $$P_k = [e^{j\theta_1^k}, e^{j\theta_2^k}, \ldots, e^{j\theta_M^k}]^T, k=1,\ldots,K \qquad (9)$$

is applied as a phase correction to the set of M channel estimates (step 403) to produce K sets of hypothetical phase-corrected channel estimates, $\hat{h}_{i,k}^{corr}$, according to $$\hat{h}_{i,k}^{corr} = \hat{h}_i e^{j\theta_i^k}, i=1,\ldots,M \text{ and } k=1,\ldots,K \qquad (10)$$

where M is the number of channel estimates obtained from the CQI pilots and K is the number of hypothesized sets of phase corrections (each set of phase corrections itself having M elements). The K hypothesized phase shift sequences are advantageously stored in a lookup table, and can be obtained from earlier-performed laboratory experiments. Different hypothesized phase shift sequences can be designed for different delay spreads and PDPs, so that at least one of them will correspond to actual conditions experienced by the communication equipment.

Then, for each of K hypothesized sets of corrected channel estimates, coherent combination of the M channel estimates belonging to that set is performed (step 405) to obtain K combined signal power estimates according to:

$$\hat{S}_k = \left| \sum_{i=1}^{M} \alpha_i \hat{h}_{i,k}^{corr} \right|^2, k=1,\ldots,K \qquad (11)$$

Now that K signal power values have been generated, the one having the highest value is selected for use as the signal power estimate (step 407), that is:

$$\text{Signal Power Estimate} = \max\{\hat{S}_k\}, k=1,\ldots,K \qquad (12)$$

In some embodiments, techniques can be applied to adapt the hypothesized sets of phase corrections, and thereby reduce the testing to a smaller number of hypotheses. For example, knowledge of the delay spread and/or PDP can be used to determine which hypothesized sets of phase corrections are more likely to represent the true set off phase corrections. To illustrate this, suppose M CQI pilot symbols are equidistantly spaced in frequency at a distance of $\Delta f$ and that the phase shift is assumed to vary in a linear fashion across sub-carriers. (It will be understood that equation (9) does not require the hypothesized phase shift values to vary linearly across sub-carriers.) The phase shift sequence will then be of the form:

$$P_k = [1, e^{j\theta_k}, e^{j2\theta_k}, \ldots, e^{j(M-1)\theta_k}] \qquad (13)$$

The K sets of hypothesized phase corrections are then generated by hypothesizing K different values of $\theta$.

Figure 5:
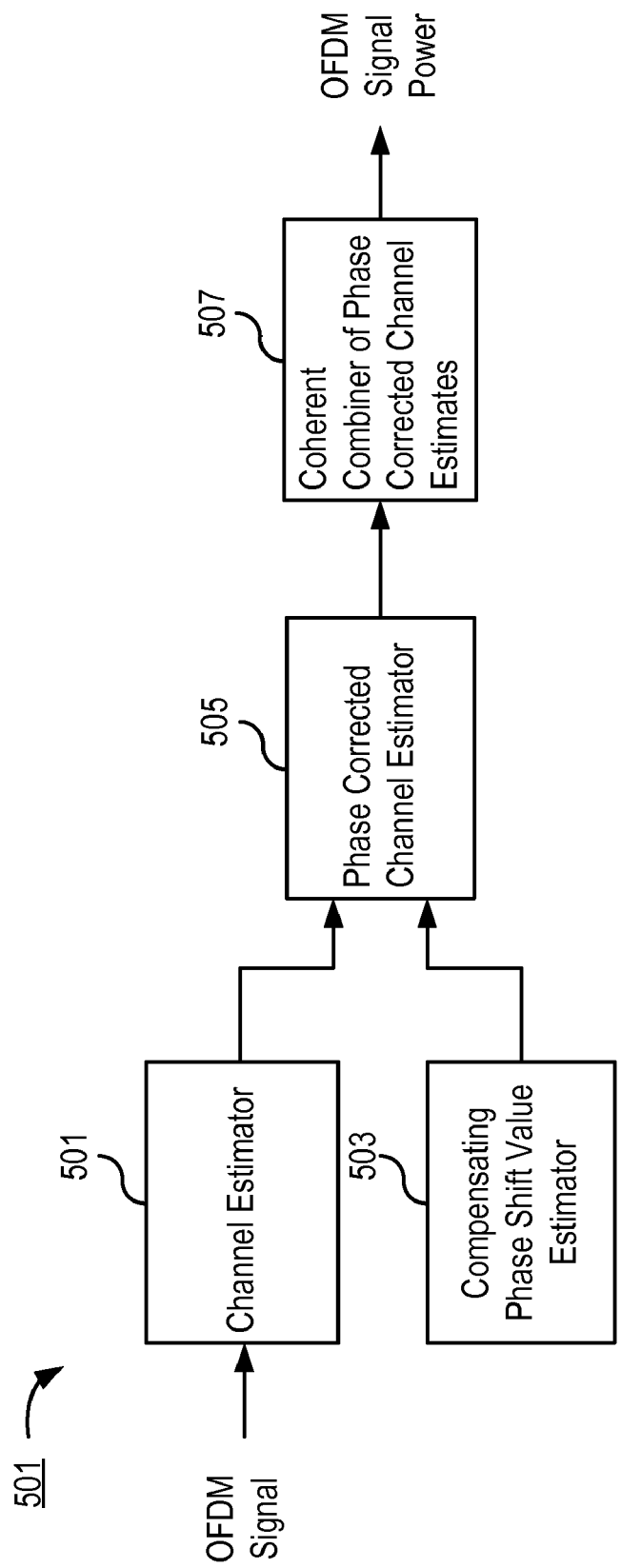
FIG. 5 is a block diagram of an exemplary apparatus in accordance with aspects of the invention.

To further facilitate the reader's understanding of aspects consistent with embodiments of the invention, a block diagram of an exemplary apparatus in accordance with the invention will now be discussed in connection with FIG. 5. The exemplary apparatus 500 comprises a channel estimator 501 for ascertaining a plurality of channel estimates from an OFDM signal. The apparatus 500 also comprises a compensating phase shift value estimator for estimating one or more compensating phase shift values for aligning the plurality of channel estimates with respect to phase. Outputs from the channel estimator 501 and the compensating phase shift value estimator 503 are supplied to a phase corrected channel estimator 505 for generating a plurality of phase corrected channel estimates by using the one or more compensating phase shift values to align the plurality of channel estimates with respect to phase. Outputs from the phase corrected channel estimator 505 are supplied to a coherent combiner of phase corrected channel estimates 507 that is for coherently combining the phase corrected channel estimates, thereby ascertaining the signal power of the OFDM signal.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of ascertaining a signal power of an Orthogonal Frequency Division Multiplexing (OFDM) signal, the method comprising:
cellular communication equipment performing the following:
ascertaining a plurality of channel estimates from the OFDM signal;
estimating one or more compensating phase shift values for aligning the plurality of channel estimates with respect to phase;
generating a plurality of phase corrected channel estimates by using the one or more compensating phase shift values to align the plurality of channel estimates with respect to phase; and
coherently combining the phase corrected channel estimates, thereby ascertaining the signal power of the OFDM signal,
wherein:
estimating the one or more compensating phase shift values for aligning the plurality of reference symbols with respect to phase comprises:
applying each of a plurality, K, of hypothesized sets of phase corrections to the plurality channel estimates to obtain K sets of hypothesized phase corrected channel estimates; and
coherently combining the phase corrected channel estimates comprises:
producing K hypotheses of the signal power of the OFDM signal by, for each of the K sets of hypothesized phase corrected channel estimates, coherently combining the hypothesized phase corrected channel estimates; and
ascertaining the signal power of the OFDM signal by ascertaining which of the K hypotheses of the signal power of the OFDM signal is a maximum one of the K hypotheses of the signal power of the OFDM signal.

2. The method of claim 1, wherein ascertaining the plurality of channel estimates from the OFDM signal comprises:
ascertaining one or more channel estimates from one or more of a number of sub-carriers of the OFDM signal; and
ascertaining one or more of the channel estimates from one or more other ones of the sub-carriers of the OFDM signal.

3. The method of claim 2, wherein estimating the one or more compensating phase shift values for aligning the plurality of reference symbols with respect to phase comprises:
ascertaining which of a plurality of samples of the OFDM signal would be a starting point of a Fast Fourier Transform (FFT) causing a smallest rotation across sub-carriers; and
estimating the one or more compensating phase shift values as a function of a relative distance between an actual starting point of the FFT and the starting point of the FFT causing the smallest rotation across sub-carriers.

4. The method of claim 3, wherein the starting point of the FFT causing the smallest rotation across sub-carriers corresponds to a maximum peak of a power delay profile of a channel through which the OFDM signal was transmitted.

5. The method of claim 3, wherein the starting point of the FFT causing the smallest rotation across sub-carriers corresponds to a center of gravity of a power delay profile of a channel through which the OFDM signal was transmitted.

6. The method of claim 2, wherein estimating the one or more compensating phase shift values for aligning the plurality of reference symbols with respect to phase comprises:
ascertaining a power delay profile of a channel through which the OFDM signal was transmitted;
applying a Fast Fourier Transform (FFT) to the power delay profile to obtain an estimate of the channel through which the OFDM signal was transmitted; and
using the estimate of the channel to obtain the one or more compensating phase shift values as a function of a delay spread value.

7. The method of claim 1, comprising:
using information about a delay spread of a channel through which the OFDM signal was transmitted to initially obtain the K hypothesized sets of phase corrections.

8. The method of claim 1, comprising:
using information about a power delay profile of a channel through which the OFDM signal was transmitted to initially obtain the K hypothesized sets of phase corrections.

9. The method of claim 1, wherein each of the hypothesized sets of phase corrections comprises phase correction values that are linear across sub-carriers.

10. The method of claim 1, wherein estimating the one or more compensating phase shift values for aligning the plurality of channel estimates with respect to phase comprises:
ascertaining a delay spread value of a channel through which the OFDM signal was transmitted; and
estimating the one or more compensating phase shift values as a function of the delay spread value.

11. The method of claim 10, wherein estimating the one or more compensating phase shift values as a function of the delay spread value comprises computing a phase shift between a first sub-carrier at frequency $f_i$ and a second sub-carrier at frequency $f_k$ in accordance with:

$$\text{compensating phase shift} = e^{j2\pi(f_i - f_k)\Delta t},$$

wherein $\Delta t$ is the delay spread value.

12. An apparatus for ascertaining a signal power of an Orthogonal Frequency Division Multiplexing (OFDM) signal, the apparatus comprising:
means for ascertaining a plurality of channel estimates from the OFDM signal;
means for estimating one or more compensating phase shift values for aligning the plurality of channel estimates with respect to phase;
means for generating a plurality of phase corrected channel estimates by using the one or more compensating phase shift values to align the plurality of channel estimates with respect to phase; and
means for coherently combining the phase corrected channel estimates, thereby ascertaining the signal power of the OFDM signal, wherein:
the means for estimating the one or more compensating phase shift values for aligning the plurality of reference symbols with respect to phase comprises:
means for applying each of a plurality, K, of hypothesized sets of phase corrections to the plurality channel estimates to obtain K sets of hypothesized phase corrected channel estimates; and
the means for coherently combining the phase corrected channel estimates comprises:
means for producing K hypotheses of the signal power of the OFDM signal by, for each of the K sets of hypothesized phase corrected channel estimates, coherently combining the hypothesized phase corrected channel estimates; and means for ascertaining the signal power of the OFDM signal by ascertaining which of the K hypotheses of the signal power of the OFDM signal is a maximum one of the K hypotheses of the signal power of the OFDM signal.

13. The apparatus of claim 12, wherein the means for ascertaining the plurality of channel estimates from the OFDM signal comprises:

means for ascertaining one or more channel estimates from one or more of a number of sub-carriers of the OFDM signal; and means for ascertaining one or more of the channel estimates from one or more other ones of the sub-carriers of the OFDM signal.

14. The apparatus of claim 13, wherein the means for estimating the one or more compensating phase shift values for aligning the plurality of reference symbols with respect to phase comprises:

means for ascertaining which of a plurality of samples of the OFDM signal would be a starting point of the Fast Fourier Transform (FFT) causing a smallest rotation across sub-carriers; and means for estimating the one or more compensating phase shift values as a function of a relative distance between an actual starting point of the FFT and the starting point of the FFT causing the smallest rotation across sub-carriers.

15. The apparatus of claim 14, wherein the starting point of the FFT causing the smallest rotation across sub-carriers corresponds to a maximum peak of a power delay profile of a channel through which the OFDM signal was transmitted.

16. The apparatus of claim 14, wherein the starting point of the FFT causing the smallest rotation across sub-carriers corresponds to a center of gravity of a power delay profile of a channel through which the OFDM signal was transmitted.

17. The apparatus of claim 13, wherein the means for estimating the one or more compensating phase shift values for aligning the plurality of reference symbols with respect to phase comprises:

means for ascertaining a power delay profile of a channel through which the OFDM signal was transmitted;

means for applying a Fast Fourier Transform (FFT) to the power delay profile to obtain an estimate of the channel through which the OFDM signal was transmitted; and means for using the estimate of the channel to obtain the one or more compensating phase shift values as a function of a delay spread value.

18. The apparatus of claim 12, comprising:

means for using information about a delay spread of a channel through which the OFDM signal was transmitted to initially obtain the K hypothesized sets of phase corrections.

19. The apparatus of claim 12, comprising:

means for using information about a power delay profile of a channel through which the OFDM signal was transmitted to initially obtain the K hypothesized sets of phase corrections.

20. The apparatus of claim 12, wherein each of the hypothesized sets of phase corrections comprises phase correction values that are linear across sub-carriers.

21. The apparatus of claim 12, wherein the means for estimating the one or more compensating phase shift values for aligning the plurality of channel estimates with respect to phase comprises:

means for ascertaining a delay spread value of a channel through which the OFDM signal was transmitted; and means for estimating the one or more compensating phase shift values as a function of the delay spread value.

22. The apparatus of claim 21, wherein the means for estimating the one or more compensating phase shift values as a function of the delay spread value comprises means for computing a phase shift between a first sub-carrier at frequency $f_i$, and a second sub-carrier at frequency $f_k$ in accordance with:

$$\text{compensating phase shift} = e^{j2\pi(f_i - f_k)\Delta t},$$

wherein $\Delta t$ is the delay spread value.

* * * * *

UNITED STATES PATENT AND TRADEMARK OFFICE
CERTIFICATE OF CORRECTION

PATENT NO. : 7,907,673 B2
APPLICATION NO. : 11/762382
DATED : March 15, 2011
INVENTOR(S) : Wilhelmsson et al.

It is certified that error appears in the above-identified patent and that said Letters Patent is hereby corrected as shown below:

On Title Page 2, in Item (56), under "OTHER PUBLICATIONS", in Column 2, Line 3, delete "Serach" and insert -- Search --, therefor.

In Column 9, Line 24, delete "$1 \text{ of } e^{-j2\pi(k-1)n/N_{FFT}},$" and insert -- $l \text{ of } e^{-j2\pi(k-l)n/N_{FFT}},$ --, therefor.

Signed and Sealed this
Sixth Day of March, 2012

David J. Kappos
*Director of the United States Patent and Trademark Office*